US007611350B2

(12) United States Patent
Evers et al.

(10) Patent No.: US 7,611,350 B2
(45) Date of Patent: Nov. 3, 2009

(54) INJECTION MOLDING APPARATUS AND METHOD FOR THE USE SUCH AN INJECTION MOLDING APPARATUS

(75) Inventors: Marinus F. J. Evers, Heeze (NL); Michael A. T. Hompus, Helmond (NL)

(73) Assignee: OTB Group B.V., Eindhoven (NL)

( * ) Notice: Subject to any disclaimer, the term of this patent is extended or adjusted under 35 U.S.C. 154(b) by 556 days.

(21) Appl. No.: 10/566,649

(22) PCT Filed: Aug. 2, 2004

(86) PCT No.: PCT/NL2004/000546

§ 371 (c)(1),
(2), (4) Date: Jun. 22, 2006

(87) PCT Pub. No.: WO2005/023510

PCT Pub. Date: Mar. 17, 2005

(65) Prior Publication Data

US 2006/0246171 A1   Nov. 2, 2006

(30) Foreign Application Priority Data

Aug. 6, 2003   (NL) .................................... 1024055

(51) Int. Cl.
B25C 45/00 (2006.01)
(52) U.S. Cl. .................. 425/583; 425/145; 425/149; 425/162; 264/40.3; 264/40.5; 264/40.7
(58) Field of Classification Search ................. 425/583, 425/145
See application file for complete search history.

(56) References Cited

U.S. PATENT DOCUMENTS 6,026,696 A    2/2000   Hehl 6,406,286 B1 * 6/2002 Hehl .......................... 425/145

(Continued)

FOREIGN PATENT DOCUMENTS

DE    44 09 822 C2   8/1995

(Continued)

*Primary Examiner*—Philip C Tucker
*Assistant Examiner*—Amjad Abraham
(74) *Attorney, Agent, or Firm*—Pillsbury Winthrop Shaw Pittman LLP

(57) ABSTRACT

An injection molding apparatus provided with a central control and with a screw which extends in a cylinder, which cylinder is provided with a filing opening and with a nozzle, the screw being drivingly connected with two controllable electric motors such that a movement in rotational and/or axial sense can be imposed on the screw, the driving connection comprising a number of cylindrical planetary rollers accommodated for rotation in a planetary cage such that the planetary rollers can be engaged from a space located radially outside the planetary cage and a space located radially within the planetary cage, the planetary cage being connected to the screw in a manner secured against rotation, while a first drive part connected with a rotor of the first electric motor, is provided with a first engaging surface facing radially inward which engages the planetary rollers from the space located radially outside the planetary cage, while a second drive part, connected with a rotor of the second electric motor is provided with a second engaging surface facing outwards which engages the planetary rollers from a space located radially within the planetary cage.

26 Claims, 2 Drawing Sheets

Figure 1:
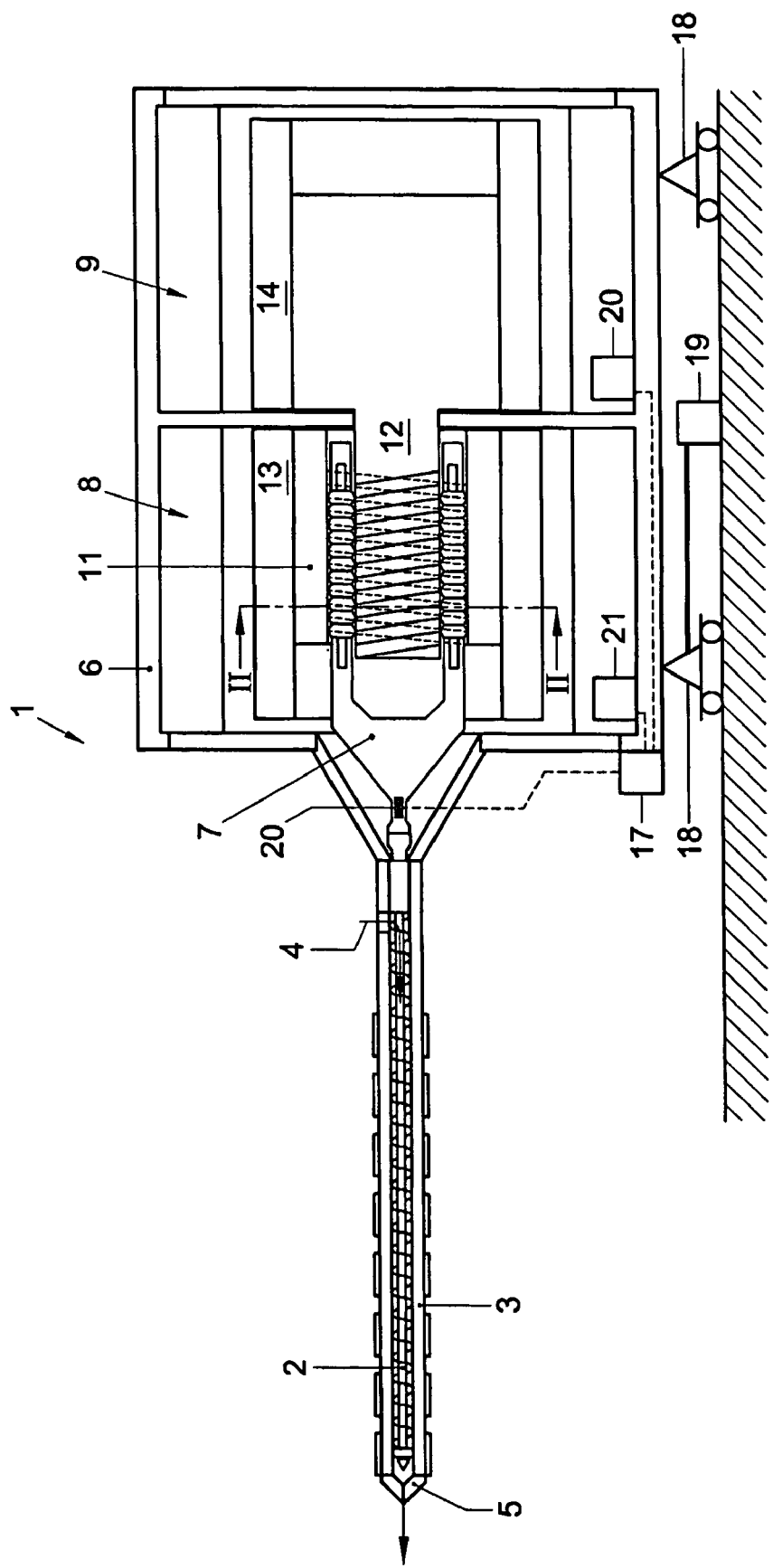

U.S. PATENT DOCUMENTS 6,682,338 B2 * 1/2004 Maurilio ..................... 425/567
2004/0116218 A1 * 6/2004 Butsch et al. .................. 474/8

FOREIGN PATENT DOCUMENTS

| | | |
|---|---|---|
| DE | 195 36 565 C2 | 4/1997 |
| EP | 0 882 564 B1 | 11/2000 |
| EP | 1 083 036 B1 | 6/2002 |
| EP | 1 215 029 B1 | 5/2004 |
| WO | WO 97/07959 | 3/1997 |

* cited by examiner

INJECTION MOLDING APPARATUS AND METHOD FOR THE USE SUCH AN INJECTION MOLDING APPARATUS

This application is the National Phase of PCT/NL2004/000546, filed Aug. 2, 2004, which claims priority to Netherlands application 1024055, filed Aug. 6, 2003, the entire contents of both applications being incorporated herein by reference in their entireties.

The invention relates to an injection molding apparatus provided with a central control and with a screw which extends in a cylinder, which cylinder is provided with a filling opening and with a nozzle, the screw being drivingly connected with two controllable electric motors such that a movement in rotational and/or axial sense can be imposed.

The invention also relates to a method for manufacturing an injection molded product while utilizing such an injection molding apparatus.

Such an injection molding apparatus is known from EP-A-0 882 564. With the known injection molding apparatus, the first electric motor serves for the rotation of the screw spindle. The second electric motor serves for the translation of the screw spindle.

In view of the required injection speed, the most commonly used drive for the axial movement of the screw is a hydraulic drive. However, hydraulic drives have a number of disadvantages, among which the following:

the stiffness of a hydraulic drive system is much lower than that of an electric drive system;
in the system, often oil pressure pulsations arise, which is not beneficial to the axial positioning accuracy;
a hydraulic drive is much dirtier than an electric drive;
the static losses of a hydraulic drive are much greater than in electric drives; also when the screw is idle, hydraulic pressure must be provided, which takes energy.

With an injection molding apparatus according to EP-A-0 882 564, these problems have been solved. However, the electrically driven injection molding apparatus known has a number of disadvantages, among which the following:

for the axial movement, the total power must be provided by the one electric motor, so the electric motor in question must have a considerable power;
for the rotational movement, the total power must be provided by the other electric motor, so the electric motor in question must have a considerable power;
when the axial movement is initiated, the electric motor serving for the movement in question must be caused to rotate from standstill; this leads to a transition in the frictional resistance (static frictional resistance to dynamic frictional resistance) of the bearing and transmission of the respective electric motor; such a transition in frictional resistance makes an accurate force feedback by way of motor current measurement impossible;
between the electric motors, the drive shaft and the drive housing, there are a number of force transmission mechanisms (D1, D2, D3, E1) which convert the rotation into an axial movement alone, or a rotational movement alone, or a combination of an axial and a rotational movement of the screw; such transmission mechanisms lead to loss of accuracy and moreover consume energy;
the heavy motors and the associated transmissions lead to a considerable mass which must each time be set into motion; the mass inertia is therefore high and therefore the dynamic behavior, specifically the control speed, of the known apparatus leaves to be desired.

These problems have been substantially solved by the proposal from European patent application EP-A-1 083 036 and European patent application EP-A-1 215 029. In those known injection molding machines, the drive shaft is provided with two sections of thread of opposite pitch. Each section is engaged by a driving nut, which driving nuts are each driven independently of each other by an electric drive motor.

The drawback of the apparatus described in EP-A-1 083 036 and EP-A-215 029 is that manufacturing the drive shaft is particularly critical as the quality and the position of the two thread sections relative to each other requires much precision. Therefore, the drive shafts known from EP-A-1 083 036 and EP-A-1 215 029 are particularly costly. Another drawback of the known apparatus is that the driving nuts are provided with internal thread engaging the thread sections of the drive shaft. Therefore, for linear displacement over a particular length, a corresponding length of thread on the drive shaft is required plus the necessary run-out of the thread. Thus, this leads to the drawback that for the required axial stroke, the known injection molding apparatus needs to have a greater length than strictly necessary.

One object of the invention is to provide an electric injection molding apparatus without the drawbacks described hereinabove while maintaining the advantages thereof. Another object of the invention is to provide a method for the use of such an injection molding apparatus.

To that end, the injection molding apparatus of the type described in the opening paragraph hereof is characterized, according to the invention, in that the driving connection comprises a number of cylindrical planetary rollers, accommodated for rotation in a planetary cage such that the planetary rollers can be engaged from a space located radially outside the planetary cage and from a space located radially within the planetary cage, the planetary cage being connected with the screw in a manner secured against rotation and translation, while a first drive part, connected with a rotor of the first electric motor, is provided with a first engaging surface facing radially inwards and engaging the planetary rollers from a space located radially outside the planetary cage, while a second drive part, connected with the rotor of the second electric motor, is provided with a second engaging surface facing radially outwards and engaging the planetary rollers from a space located radially within the planetary cage.

With a correct choice of the design of the engaging surfaces of the first and second drive parts and with a correct design of the casing surface of the planetary rollers, when the electric motors are operated in a suitable manner, any desired combination of rotation and axial translation of the screw can be effected. As a planetary cage is used whose planetary rollers are engaged by the drive parts from the radial inside as well as from the radial outside, a very complex construction can be realized. The axial length of the apparatus according to the invention can be reduced considerably with respect to the apparatus known while maintaining the advantages of those known apparatus. Moreover, the radial dimensions of the drive housing need hardly, if at all, be enlarged.

According to a further elaboration of the invention, the planetary rollers are provided with parallel grooves and backs which bound each other mutually and which are located in planes extending perpendicularly to a central axis of a respective planetary roller, the first engaging surface comprising internal thread and the second engaging surface comprising external thread, while the hand of the internal thread is opposite to the hand of the external thread.

With such a design of the engaging surfaces of the drive parts and of the outer casing surface of the planetary rollers, it is effected that the planetary rollers cannot slip as they are confined between the internal thread and the external thread of opposite pitch. When the drive parts rotate in opposite directions, axial translation of the screw occurs. When the drive parts rotate in the same direction, rotation of the screw occurs. When the pitch of the internal thread and the external thread are equal but the hands are opposite, the above-mentioned situations will arise with equal rotational speeds of the two drive parts. When, under those conditions, the drive speeds of the drive parts deviate from each other, a combined axial translation and rotation of the screw will be obtained. The sum of the torques of the two electric motors provides the output torque and the difference of the torques of the two electric motors provides, via the transmission to the drive shaft, the axial force.

In order to keep the control relatively simple, it is preferred that the pitch angle of the internal thread and the external thread are equal but that the hands are opposite. Apart from the drive part connected with the rotor, the electric motors can then be of the same type, which is favorable from a maintenance point of view.

The method of the type described in the opening paragraph hereof is characterized in that the rotational direction and the rotational speed of the first and second electric motor are varied such that the planetary cage and hence the screw are operatively rotated and/or translated in axial direction according to a desired pattern and/or while exerting a desired axial force, while the power required for the axial translation is provided by the two electric motors and the power required for the rotation is provided by the two electric motors.

With such an apparatus and method, the power required for the axial movement is provided by two electric motors. The power for the rotational movement too is provided by these two electric motors.

With a desired maximum axial force, the electric motors in the apparatus according to the invention can therefore have half the power the electric motor for the axial displacement in the known apparatus has. This also holds true for the rotation. What it amounts to is that, basically, the electric motors in the apparatus according to the invention can be half as heavy as the apparatus known from EP-A-0 882 564. This also entails that the thermal loading of the drive as a whole is better distributed over the housing. Accordingly, a simple convective cooling or a water cooling of very small design will suffice. The fact that cooling is problem appears from the European publication EP-A 0 882 564 mentioned. Further, the distribution of the load over two electric motors has as a consequence that mass inertia in proportion to the torque to be realized by the electric motors of the apparatus according to invention is considerably more favorable than that of the known apparatus. The axial displacement, which specifically during injection is to take place at high speed, can therefore take place faster with the apparatus according to the invention and costs less energy. Moreover, fewer retardation and acceleration forces arise, so that a better control is obtained of the loading of the electric motors for the purpose of generating the injection force and the plasticizing force. Since during injection the electric motors rotate in opposite senses, at least when the internal and external thread have opposite hands, the two motors have an opposite reaction torque. As a result, hardly any external reaction torque arises, if at all, so that the suspension of the drive housing with respect to the external world can be made of relatively light design.

According to an alternative, further elaboration of the invention, the planetary rollers can be provided with external thread. The first and/or the second engaging surface can then be provided with parallel grooves and backs bounding each other mutually and which are located in planes extending perpendicularly to a central heart line of the first or second drive part, respectively.

With such an embodiment, similar advantages as those described hereinabove with reference to the first alternative can be obtained.

Preferably, each electric motor is provided with its own motor control, the injection molding apparatus being provided with a central control which is designed for passing desired values of a particular control quantity to the two motor controls, while in some phases of the injection process the control quantity values passed by the central control are determined on the basis of force measurements or motor current measurements while, in other phases, they are determined on the basis of the desired positions of the screw in the cylinder.

Since the motor controls in each case receive control signals on the basis of the same control quantity, such as, for instance, position, speed, acceleration and/or jerk, no control regulation switch needs to take place in the motor controls, which improves the stability of the motion profile of the motors. Sometimes, a transition from one type of input signal to another type of input signal, for instance from a force input signal to a position input signal, leads to a briefly undefined motion behavior of the respective motor.

During the injection phase, accurate metering of a particular volume into the mold is of major importance. Specifically when injection molding CDs and DVDs, where use is made of not entirely closed molds and where, accordingly, the filling pressure is not a measure of whether the mold is completely filled, a non-force controlled but, for instance, a position-controlled, speed-controlled and/or acceleration-controlled injection phase is of great advantage. Incidentally, there are other products conceivable that involve work with a partially opened mold and where the volume to be metered is therefore particularly critical. During the plasticizing phase and the after-pressure phase, on the other hand, maintaining a particular pressure on the fluid plastic is important. Owing to the control combining the two control principles, an injection molding apparatus is obtained that has the desired regulatory behavior in all phases mentioned.

The central control can then be designed for having the injection molding apparatus traverse a plasticizing phase, and injection phase and, optionally, and after-pressure phase.

In the plasticizing phase, the screw is rotated and moved away from the nozzle in axial direction. When sufficient fluid plastic is available, the injection phase follows in which the screw traverses a fast axial movement in the direction of the nozzle. During the injection phase, the mold to which the nozzle of the cylinder has been connected, is injected fully. Then, during hardening of the plastic in the mold, the optional after-pressure phase is traversed. In this way, shrinkage arising during the hardening in the mold is compensated in that, if necessary, the mold is supplementarily filled with plastic as a result of a certain pressure being maintained in the cylinder adjacent the nozzle.

For the purpose of the regulation based on force feedback, the central control can measure as input signal the electric current used by the first electric motor and the electric current used by the second electric motor, the central control being designed for determining, based thereon, control quantity values to be passed to the motor controls to thus regulate the filling pressure according to a desired pattern.

Specifically in the force feedback based on motor current measurement, it is important that there is a relatively direct link between the motor current demanded by the electric motors and the force provided by the screw. That is to say that the number of transmissions included between the electric motors and the screw should be minimal. In the injection molding apparatus according to the present invention, this can be realized by fixedly connecting the drive parts with respective rotors of the respective electric motors.

It is preferred that the pitch of the internal thread and the external thread is so large that the axial force the screw experiences in use can be accurately derived from the motor current used by the first and the second electric motor.

In the plasticizing phase, the rotational direction is constant and the electric motors rotate continuously. As a result thereof, there are hardly any transitions in the system from static to dynamic frictional resistance, and such a transition therefore does not contribute to the hysteresis in the motor current-controlled force feedback. As a result of this, and because the pitch of the drive shaft is large, it is possible to derive the plasticizing pressure very accurately from the difference currents of the two motors, to subsequently adjust only the rotational speed of the two motors to achieve the proper propulsive pressure for the plasticization.

In an alternative elaboration, the injection molding apparatus can be provided with at least one force sensor, such as piezoelectric elements or strain gauges, measuring a force exerted by the screw, while the at least one force sensor is connected to the central control for the purpose of force feedback, while the central control is designed for determining, on the basis of a signal produced by the at least one force sensor, control quantity values to thus regulate the filling pressure according to a desired pattern.

With such an embodiment too, some phases, such as, for instance, the injection phase of the injection molding process, can be traversed in a position-controlled manner while other phases, such as, for instance, the after-pressure phase and the plasticizing phase can be traversed in force-controlled manner.

The electric motors can each comprise a servomotor, each of which are provided with its own motor control, while the central control is arranged for generating control quantity values of the same type passing these control quantity values to the motor controls of servomotors. Modern servomotors are equipped with motor angle encoders, which motor angle encoders can be used for the position control, speed control and/or acceleration control of the screw during, for instance, the injection phase. As a result of the particularly direct transmission between the servomotors and the planetary cage or screw, and using the motor angle encoders, still an axial position control, speed control and/or acceleration control of a very high resolution is obtained. Moreover, with such servomotors, use can be made of standard high performance servo controllers, which have an excellent regulatory behavior, while the occurrence of regulatory deviations is virtually precluded.

For reasons of compact construction, power processing and cooling, it is preferred that the first and the second electric motor are coaxially arranged. Moreover, as a result, during the injection phase, the external torque that the two motors produce is mutually cancelled out if the hand of the internal thread and the external thread is opposite, so that the resulting external torque is nil.

Further elaborations of the invention are described in the subclaims and will be further clarified hereinbelow with reference to the drawing.

Figure 2:
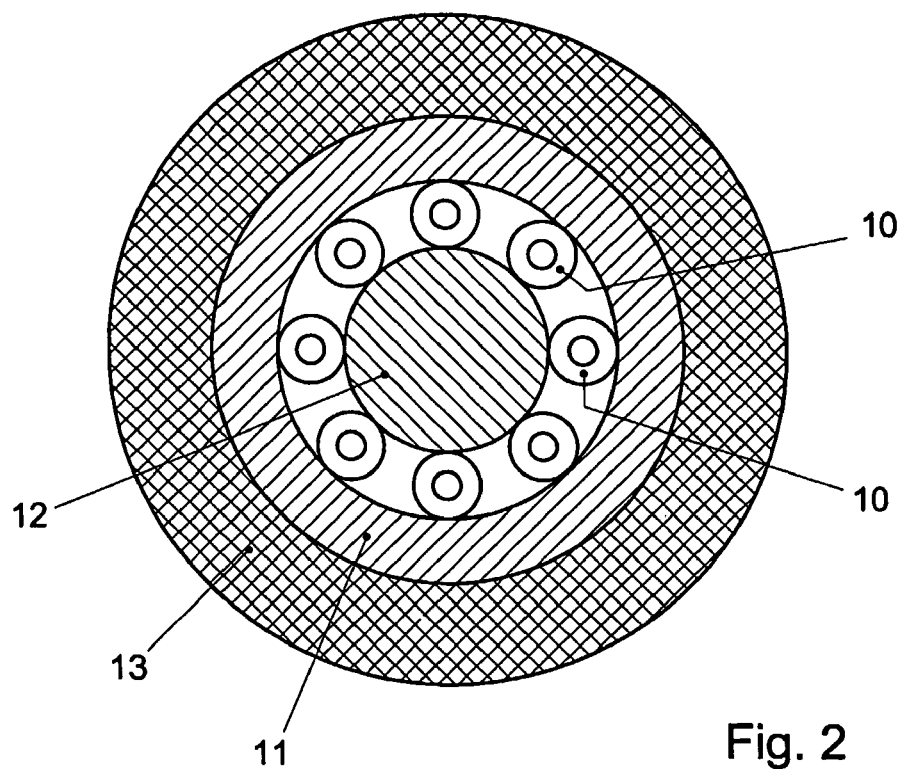
Figure 3:
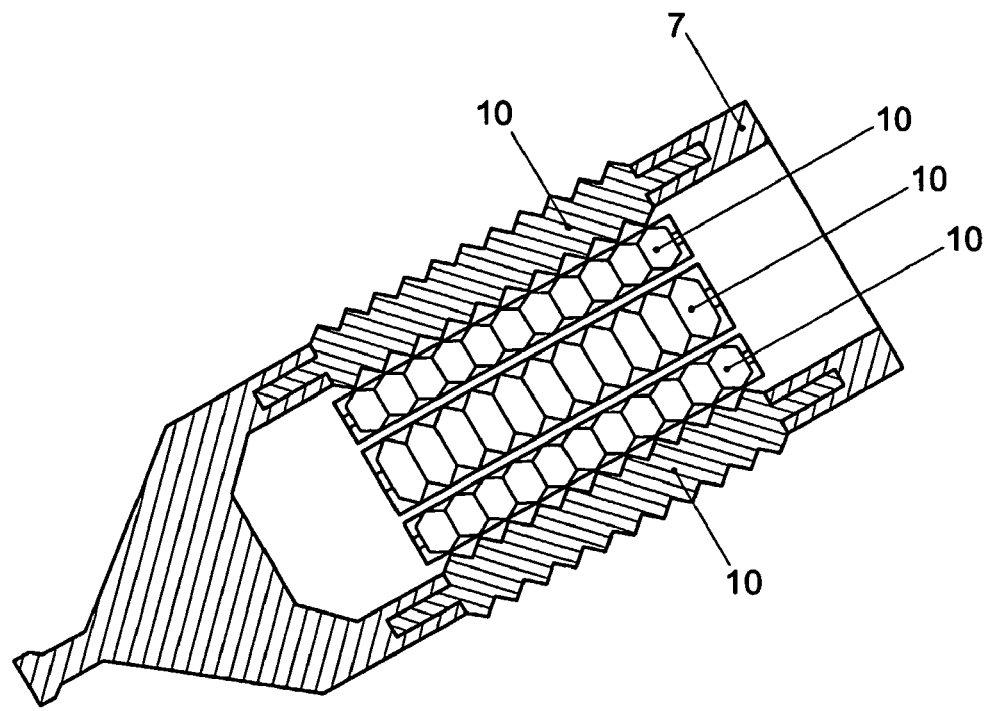

FIG. 1 schematically shows a longitudinal cross section of an exemplary embodiment of the invention;

FIG. 2 schematically shows a cross-sectional view along the line II-II of FIG. 1; and FIG. 3 schematically shows a longitudinal cross section of the planetary cage with the planetary rollers accommodated therein.

The exemplary embodiment represented in FIGS. 1-3 shows an injection molding apparatus 1 provided with a screw 2 which extends in a cylinder 3. The cylinder 3 is provided with a filling opening 4 for introducing plastic granulate, and with a nozzle 5 which can be connected to an injection mold. Via the nozzle 5, the plastic, fluid by then, is pressed out of the cylinder 3 into the mold. The screw 2 is connected with a planetary cage 7 accommodated in a drive housing 6. The planetary cage 7 is in driving communication with a first and a second electric motor 8 and 9, respectively.

As is apparent from, specifically, FIGS. 2 and 3, in the planetary cage 7, cylindrical planetary rollers 10 are accommodated for rotation about their own longitudinal axis such that the planetary rollers 10 can be engaged from a space located radially outside the planetary cage 7 and from a space located radially within the planetary cage 7. In axial direction, the planetary rollers 10 are fixedly bearing-mounted relative to the planetary cage 7.

From the space located radially outside the planetary cage 7, the planetary rollers 10 are engaged by a first drive part 11 which is provided with internal thread. From the space located radially within the planetary cage 7, the planetary rollers 10 are engaged by a second drive part 12 which is provided with external thread. Preferably, the pitch of the internal thread and the external thread are equal but the hands are opposite. It is then preferred that the first drive part 11 be fixedly connected to a rotor 13 of the first electric motor 8 and that the second drive part 12 be fixedly connected to the rotor 14 of the second electric motor 9. Instead of a fixed connection, a connection via a toothed belt is also a possibility although a direct connection is preferred.

Instead of internal and external thread on the drive parts 11, 12, also, a different engaging surface could be provided. For instance, concentric backs and grooves, bounding each other mutually and extending perpendicularly to the central rotation axis of the respective drive parts can then be considered. The planetary rollers 10 could then be provided with, for instance, external thread. Different combinations of concentric grooves and backs and thread are possible too.

By driving the electric motors 8, 9 in the correct manner, the screw 2 can be rotated and/or displaced in axial direction. This means that the screw 2 can be rotated only, can be displaced in axial direction only, or can traverse combined movements of rotation and displacement in axial direction.

In a schematic manner, FIG. 1 represents a central control 17 which is arranged for regulating the rotational direction and the rotational speed of the first and the second electric motor 8, 9, respectively, such that the planetary cage 7 and hence the screw 2 can operatively be rotated and/or translated in axial direction. The power needed for the axial translation is provided by both electric motors 8, 9. The power needed for the rotation too is provided by both electric motors 8, 9.

The drive housing 6 is mounted on a schematically indicated slide 18, which is provided with a, preferably electric, drive 19 for moving the drive housing 6, and the cylinder 3 connected therewith, in axial direction. Thus, the nozzle 5 can be moved away from and towards an injection molding mold.

In the present exemplary embodiment, the control 17 is arranged for having the injection molding apparatus 1 traverse a plasticizing phase, an injection phase and an after-pressure phase. In the plasticizing phase, a portion of plastic is rendered sufficiently fluid by rotating the screw 2 and simultaneously moving it slowly away from the nozzle 5. When the required amount of fluid plastic is available, the fluid in the injection phase is rapidly injected via the nozzle 5 into the mold by moving the screw 2 at high speed in the direction of the nozzle 5. When the mold is filled with the desired volume of fluid plastic, the after-pressure phase follows, in which the fluid plastic in the mold is held under pressure, so that shrinkage occurring in the mold is compensated by after-filling. To that end, in the present exemplary embodiment, the control of the first and the second electric motor 8, 9 in the plasticizing phase and the after-pressure phase is based on force feedback. In the injection phase, the control of the first and the second electric motor 8, 9 is based on position feedback.

For the purpose of the regulation based on force feedback, it is preferred to have the central control 17 determine as input signal the electric current consumed by the first electric motor 8 and the electric current consumed by the second electric motor 9. Based on the motor current measurement, the central control 17 can calculate desired control quantity values, such as, for instance, desired speeds, desired positions and/or desired accelerations, and pass these desired control quantity values to the motor controls 20, 21 of the electric motors 8, 9, preferably designed as servomotors, to thus regulate the filling pressure according to a desired pattern. With regulation based on motor current control, it is preferred that the pitch of the internal thread and the external thread is so large that the axial force the screw experiences in use can be accurately derived from the motor current consumed by the first and the second electric motor 8, 9, respectively.

On the other hand, it is also possible that the injection molding apparatus 1 is provided with at least one force sensor 20, such as, for instance a piezoelectric element or a number of strain gauges, measuring a force exerted by the screw 2. The force sensor 20 is connected to the central control 17 for the purpose of force feedback. The control 17 is arranged for calculating on the basis thereof, desired control quantity values and passing these desired control quantity values to the servomotor controls 20, 21, for regulating the filling pressure according to a desired pattern.

During the injection phase, where specifically the amount of fluid plastic to be supplied to the mold cavity is important, instead of using force feedback, the control 17 can simply specify the desired control quantity values, such as, for instance, the desired positions, the desired speeds, desired acceleration and/or desired jerk to the motor controls 20, 21, so that in that phase a pure position control, speed control, acceleration control and/or jerk control of the electric motors 8, 9 is involved.

The advantage achieved in that both during the phase controlled on the basis of force feedback or motor current feedback and the phase of the injection molding operation controlled on the basis of the control quantity value, such as, for instance, position, the input to the motor controls consists of control quantities each time of the same type, such as, for instance, position and/or speed, is that no control irregularities in the motor controls arise as a result of the switch from one input signal to the other input signal. This is because the motor controls each time receive values of the same control quantity from the central control throughout the injection molding operation.

It will be clear that the invention is not limited to the exemplary embodiment described but that various modifications are possible within the framework of the invention as defined by the claims.

For instance, all phases within a cycle may be realized on the basis of position feedback alone, so that not only in the injection phase but also in the plasticizing phase and the after-pressure phase, the movement of the screw is position-controlled.

The invention claimed is:

1. An injection molding apparatus, comprising:
a central control;
a screw which extends in a cylinder, the cylinder comprising a filling opening and a nozzle, the screw being drivingly connected to first and second controllable electric motors by a driving connection such that a movement in rotational and/or axial direction can be imposed on the screw, the driving connection comprising a number of cylindrical planetary rollers accommodated for rotation in a planetary cage such that the planetary rollers can be engaged from a space located radially outside the planetary cage and a space located radially within the planetary cage, the planetary cage being connected to the screw in a manner secured against rotation and translation;
a first drive part, connected to a rotor of the first electric motor, comprising a first engaging surface facing radially inward which engages the planetary rollers from the space located radially outside the planetary cage; and
a second drive part, connected to a rotor of the second electric motor, comprising a second engaging surface facing outwards which engages the planetary rollers from a space located radially within the planetary cage.

2. An injection molding apparatus according to claim 1, wherein the planetary rollers are provided with parallel grooves and backs bounding each other mutually and which are located in planes extending perpendicularly to a central axis of a respective planetary roller, the first engaging surface comprising an inner thread and the second engaging surface comprising an external thread, wherein the hand of the inner thread is opposite to the hand of the outer thread.

3. An injection molding apparatus according to claim 2, wherein the inner thread has a similar angle pitch to the external thread but opposite hand.

4. An injection molding apparatus according to claim 1, wherein the planetary rollers are provided with an external thread.

5. An injection molding apparatus according to claim 4, wherein the first engaging surface is provided with parallel grooves and backs bounding each other mutually and which are located in planes extending perpendicularly to a central axis of the first drive part.

6. An injection molding apparatus according to claim 4, wherein the second engaging surface is provided with parallel grooves and backs bounding each other mutually and which are located in planes extending perpendicularly to a central axis of the second drive part.

7. An injection molding apparatus according to claim 1, wherein the first drive part is fixedly connected to the rotor of the first electric motor, and the second drive part is fixedly connected to the rotor of the second electric motor.

8. An injection molding apparatus according to claim 1, wherein each electric motor is provided with its own motor control, the central control is arranged for passing desired values of a control quantity to the two motor controls, wherein in some phases of the injection process, the control quantity values passed by the central control are determined on the basis of force measurements or motor current measurements, wherein in other phases they are determined on the basis of the desired positions of the screw in the cylinder.

9. An injection molding apparatus according to claim 8, wherein the central control is arranged for having the injection molding apparatus traverse a plasticizing phase, and an injection phase.

10. An injection molding apparatus according to claim 8, wherein, for regulation based on force feedback, the central control measures as an input signal a first electric current used by the first electric motor and a second electric current used by the second electric motor, and the central control is arranged for determining, on the basis thereof, control quantity values to be passed to the motor controls to thus regulate a filling pressure according to a desired pattern.

11. An injection molding apparatus according to claim 8, further comprising a force sensor which measures a force exerted by the screw, the force sensor being connected to the central control for the purpose of force feedback, wherein the central control to is arranged for determining control quantity values on the basis of a signal produced by the force sensor, to be passed to the motor controls to thus regulate the filling pressure according to a desired pattern.

12. An injection molding apparatus according to claim 1, wherein the first and second electric motors each comprise a servomotor, each being provided with its own motor control, and the central control is arranged for generating control quantity values of the same type and passing the control quantity values to the motor controls of the servomotors.

13. An injection molding apparatus according to claim 8, wherein the control quantity is selected from position, speed, acceleration and/or jerk, or a combination thereof.

14. An injection molding apparatus according to claim 2, wherein the pitch of the inner thread and the external thread is such that an axial force the screw experiences in use can be accurately derived from motor currents used by the first and second electric motors.

15. An injection molding apparatus according to claim 1, wherein the first and the second electric motor are coaxially arranged.

16. An injection molding apparatus according to claim 1, wherein a drive housing is mounted on a slide comprising a drive for moving the drive housing and the cylinder connected therewith in axial direction.

17. A method for manufacturing an injection molded product, the method comprising:
varying a rotational direction and a rotational speed of a first and a second electric motor of an injection molding apparatus including a screw which extends in a cylinder, the cylinder comprising a filling opening and a nozzle, the screw being drivingly connected to the first and second electric motors by a driving connection, the driving connection comprising a number of cylindrical planetary rollers accommodated for rotation in a planetary cage such that the planetary rollers can be engaged from a space located radially outside the planetary cage and a space located radially within the planetary cage, the planetary cage being connected to the screw in a manner secured against rotation and translation, a first drive part, connected to a rotor of the first electric motor, comprising a first engaging surface facing radially inward which engages the planetary rollers from the space located radially outside the planetary cage, and a second drive part, connected to a rotor of the second electric motor, comprising a second engaging surface facing outwards which engages the planetary rollers from a space located radially within the planetary cage, such that the planetary cage and the screw are operatively rotated and/or translated in an axial direction according to a desired pattern and/or while exerting a desired axial force, wherein a power required for the axial translation is provided by the first and second electric motors and a power required for the rotation is provided by the first and second electric motors.

18. A method according to claim 17, further comprising traversing in one cycle of the injection molding apparatus a plasticizing phase, and an injection phase.

19. A method according to claim 17, further comprising calculating, based on force feedback, desired control quantity values and passing the desired control quantity values to first and second motor controls of the first and second electric motors, respectively, and in an injection phase, independently of forces associated therewith, directly passing the desired control quantity values to the first and second motor controls.

20. A method according to claim 19, wherein, for regulation based on force feedback, the method further comprises obtaining as an input signal an electric current used by the first electric motor and an electric current used by the second electric motor, and, on the basis thereof, passing the desired control quality values to the first and second motor controls so that a filling pressure proceeds according to a desired pattern.

21. A method according to claim 19, wherein, for regulation based on force feedback, the method further comprises obtaining as an input signal force measuring signals detected by force sensors on the screw, and, on the basis thereof, passing the desired control quantity values to the first and second motor controls so that a filling pressure proceeds according to a desired pattern.

22. A method according to claim 19, wherein the control quantity is a position, a speed, an acceleration or a jerk or a combination thereof.

23. An injection molding apparatus according to claim 9, wherein the central control is further arranged for having the injection molding apparatus traverse an after-pressure phase.

24. An injection molding apparatus according to claim 11, wherein the force sensor is a piezoelectric element or a strain gauge.

25. An injection molding apparatus according to claim 16, wherein the drive is an electric drive.

26. A method according to claim 18, further comprising traversing, in the one cycle, an after-pressure phase.

* * * * *